US012146710B2

(12) United States Patent
Um et al.

(10) Patent No.: US 12,146,710 B2
(45) Date of Patent: Nov. 19, 2024

(54) SUBSTRATE TREATING APPARATUS AND SUBSTRATE TREATING SYSTEM COMPRISING THE SAME

(71) Applicant: SEMES Co., Ltd., Chungcheongnam-do (KR)

(72) Inventors: Young Je Um, Busan (KR); Joun Taek Koo, Seoul (KR); Wan Jae Park, Gyeonggi-do (KR); Dong Hun Kim, Seoul (KR); Seong Gil Lee, Gyeonggi-do (KR); Ji Hwan Lee, Incheon (KR); Dong Sub Oh, Busan (KR); Myoung Sub Noh, Gyeonggi-do (KR); Du Ri Kim, Incheon (KR)

(73) Assignee: SEMES Co., Ltd., Chungcheongnam-do (KR)

( * ) Notice: Subject to any disclaimer, the term of this patent is extended or adjusted under 35 U.S.C. 154(b) by 252 days.

(21) Appl. No.: 17/366,247

(22) Filed: Jul. 2, 2021

(65) Prior Publication Data

US 2022/0090861 A1 Mar. 24, 2022

(30) Foreign Application Priority Data

Sep. 18, 2020 (KR) ........................ 10-2020-0120391

(51) Int. Cl.
*F27B 9/02* (2006.01)
*F27B 17/00* (2006.01)

(52) U.S. Cl.
CPC .............. *F27B 9/028* (2013.01); *F27B 9/029* (2013.01); *F27B 17/0025* (2013.01); *F27B 2009/026* (2013.01)

(58) Field of Classification Search
CPC ...... F27B 9/028; F27B 9/029; F27B 17/0025; F27B 2009/026; H01L 21/67098; H01L 21/67161
See application file for complete search history.

(56) References Cited

U.S. PATENT DOCUMENTS 6,503,365 B1 1/2003 Kim et al.
6,930,050 B2 8/2005 Kim et al.
(Continued)

FOREIGN PATENT DOCUMENTS

JP 2005307274 A 11/2005
JP 2006100795 A * 4/2006 ......... B81C 1/00531
(Continued)

OTHER PUBLICATIONS

English Translation of JP-2006100795-A, dated May 2, 2023 (Year: 2023).*
(Continued)

*Primary Examiner* — Edelmira Bosques
*Assistant Examiner* — Brett Peterson Mallon
(74) *Attorney, Agent, or Firm* — Buchanan Ingersoll & Rooney PC

(57) ABSTRACT

A substrate treating apparatus and a substrate treating system including the same are disclosed, in which the number of heat treatment chambers such as anneal chambers may be varied. The substrate treating apparatus includes a first chamber heat-treating a substrate; and a second chamber treating the substrate in another way different from heat-treatment, wherein the number of the first chambers is varied depending on the number of the second chambers that need heat treatment for the substrate.

19 Claims, 11 Drawing Sheets

(56) References Cited

U.S. PATENT DOCUMENTS

| | | | | |
|---|---|---|---|---|
| 7,776,226 | B2 | 8/2010 | Kim et al. | |
| 2003/0073323 | A1* | 4/2003 | Jeoung .............. | H01L 21/67184 438/729 |
| 2005/0236092 | A1 | 10/2005 | Kim et al. | |
| 2009/0188624 | A1* | 7/2009 | Bera ................. | H01L 21/67017 156/345.29 |
| 2009/0203211 | A1 | 8/2009 | Kim et al. | |
| 2011/0217469 | A1* | 9/2011 | Lei .................... | H01L 21/67201 414/160 |
| 2012/0322015 | A1* | 12/2012 | Kim .................. | H01L 21/67201 414/217 |
| 2020/0194283 | A1* | 6/2020 | Park .................. | H01L 21/67115 |
| 2022/0139731 | A1 | 5/2022 | Park | |

FOREIGN PATENT DOCUMENTS

| | | | | |
|---|---|---|---|---|
| KR | 100265287 | B1 | | 10/2000 |
| KR | 20130122503 | A | * | 11/2013 |
| KR | 1020140133534 | A | | 11/2014 |
| KR | 20200076765 | A | | 6/2020 |

OTHER PUBLICATIONS

Korean Request for the Submission of an Opinion for Korean Application No. 10-2020-0120391, dated Oct. 5, 2022 with translation, 14 pages.

Korean Written Decision on Registration for Korean Application No. 10-2020-0120391, dated Jul. 21, 2023 with translation, 6 pages.

* cited by examiner

[FIG. 1]
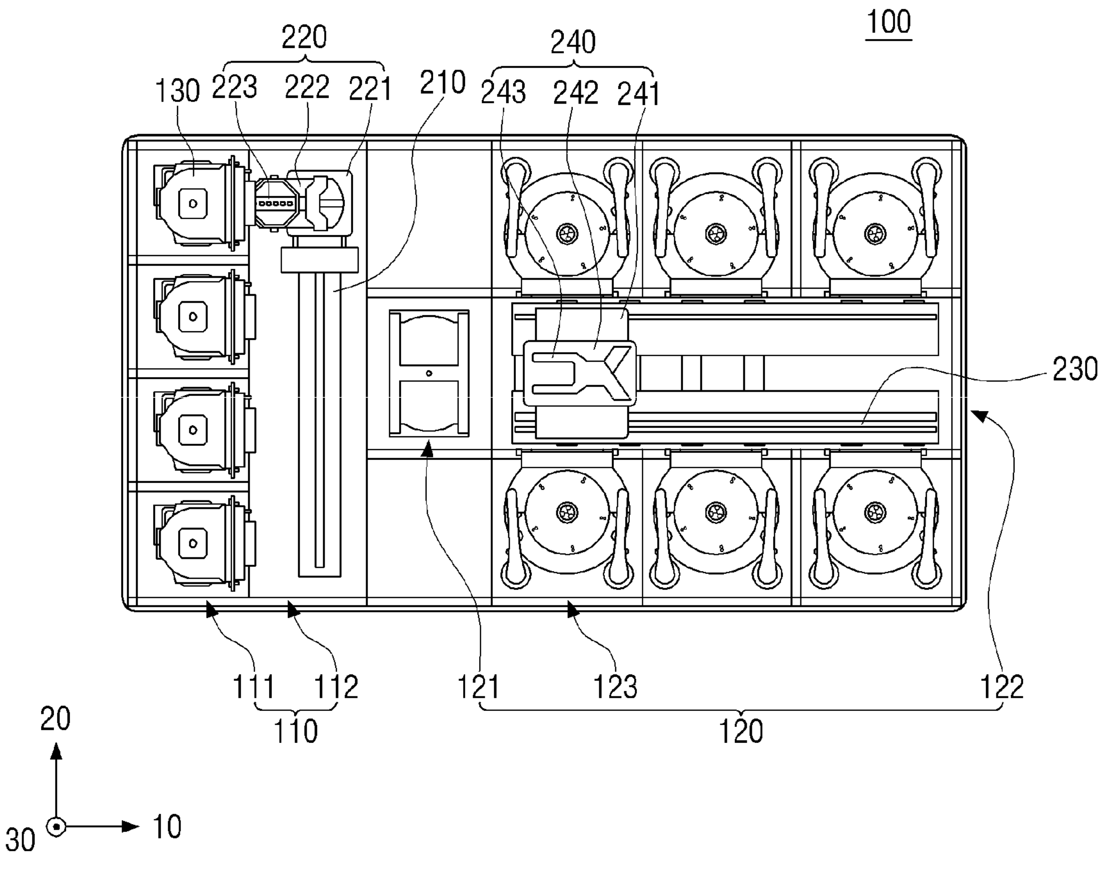

[FIG. 2]
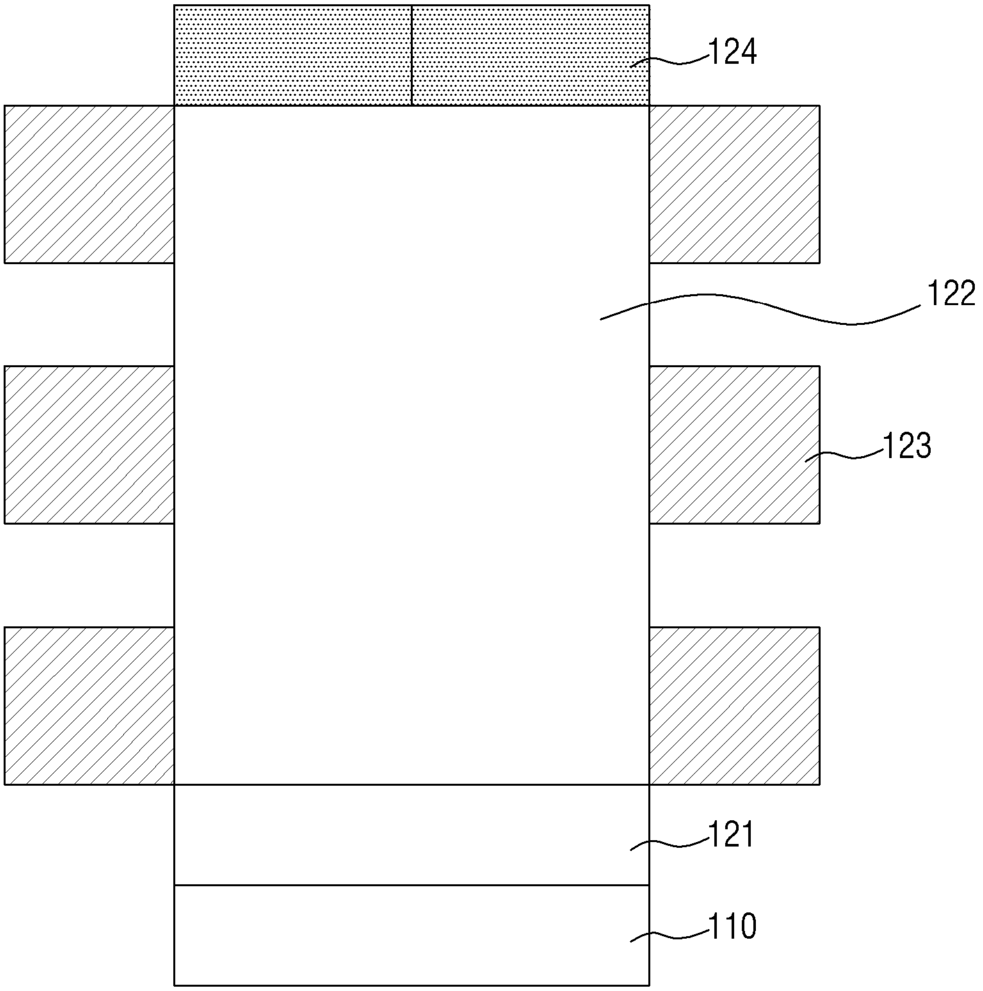

[FIG. 3]
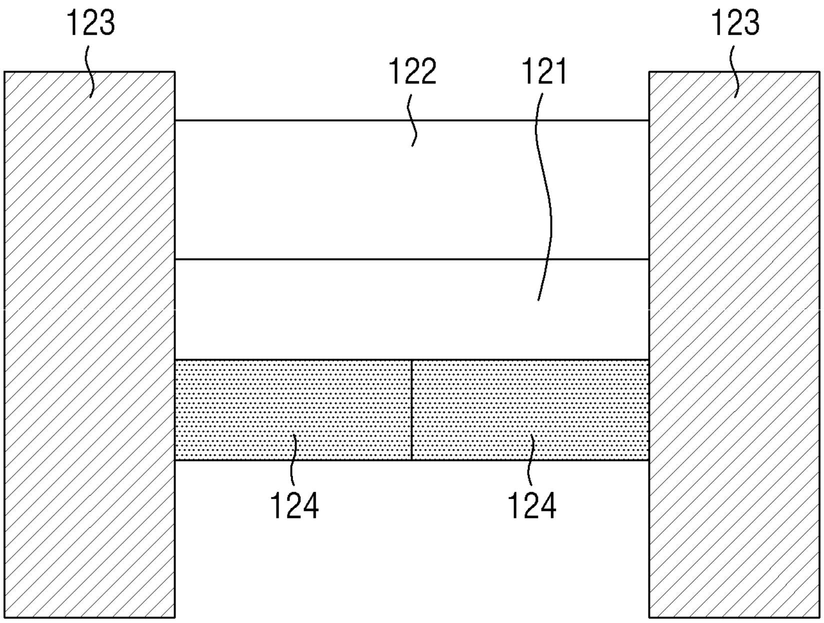
[FIG. 4]
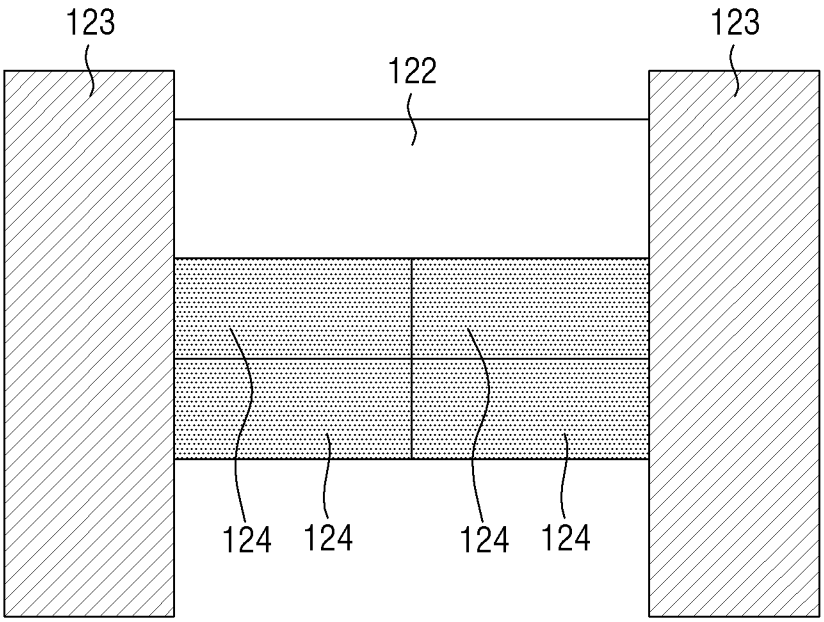

[FIG. 5]
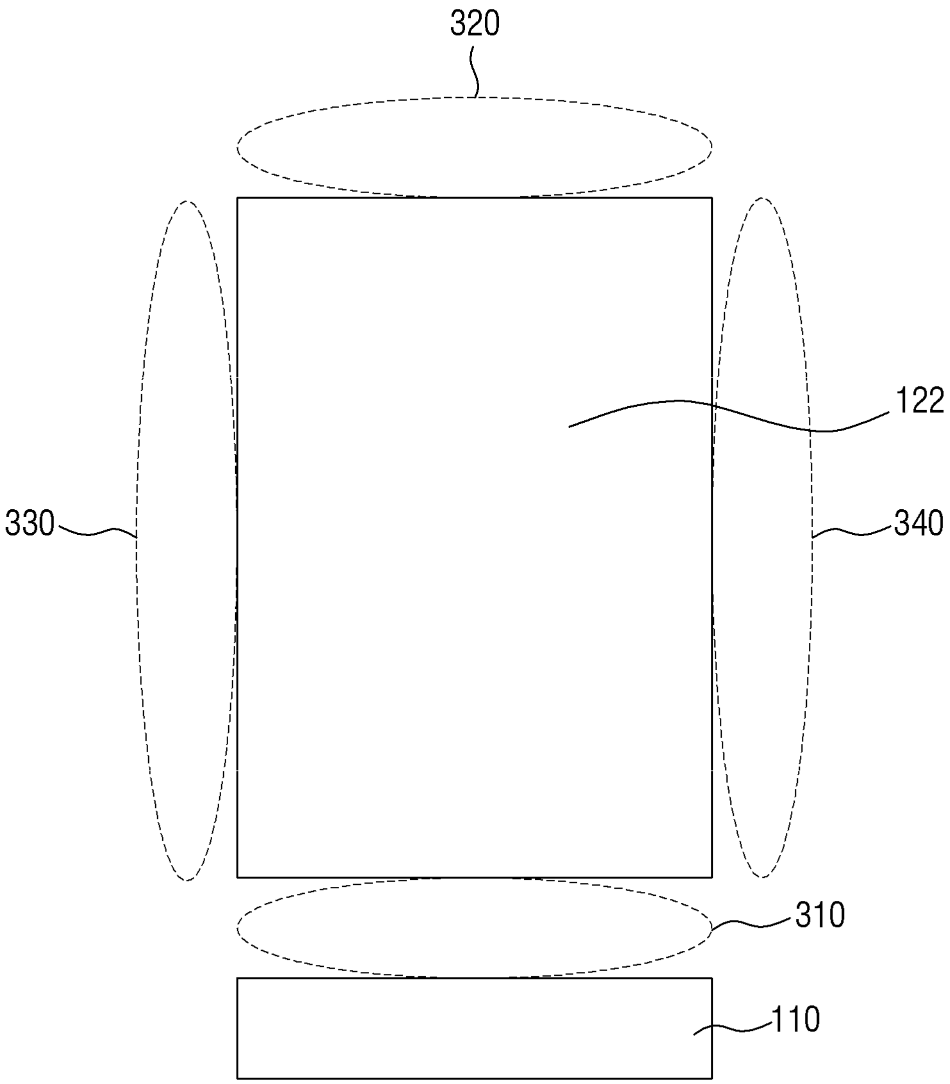

[FIG. 6]
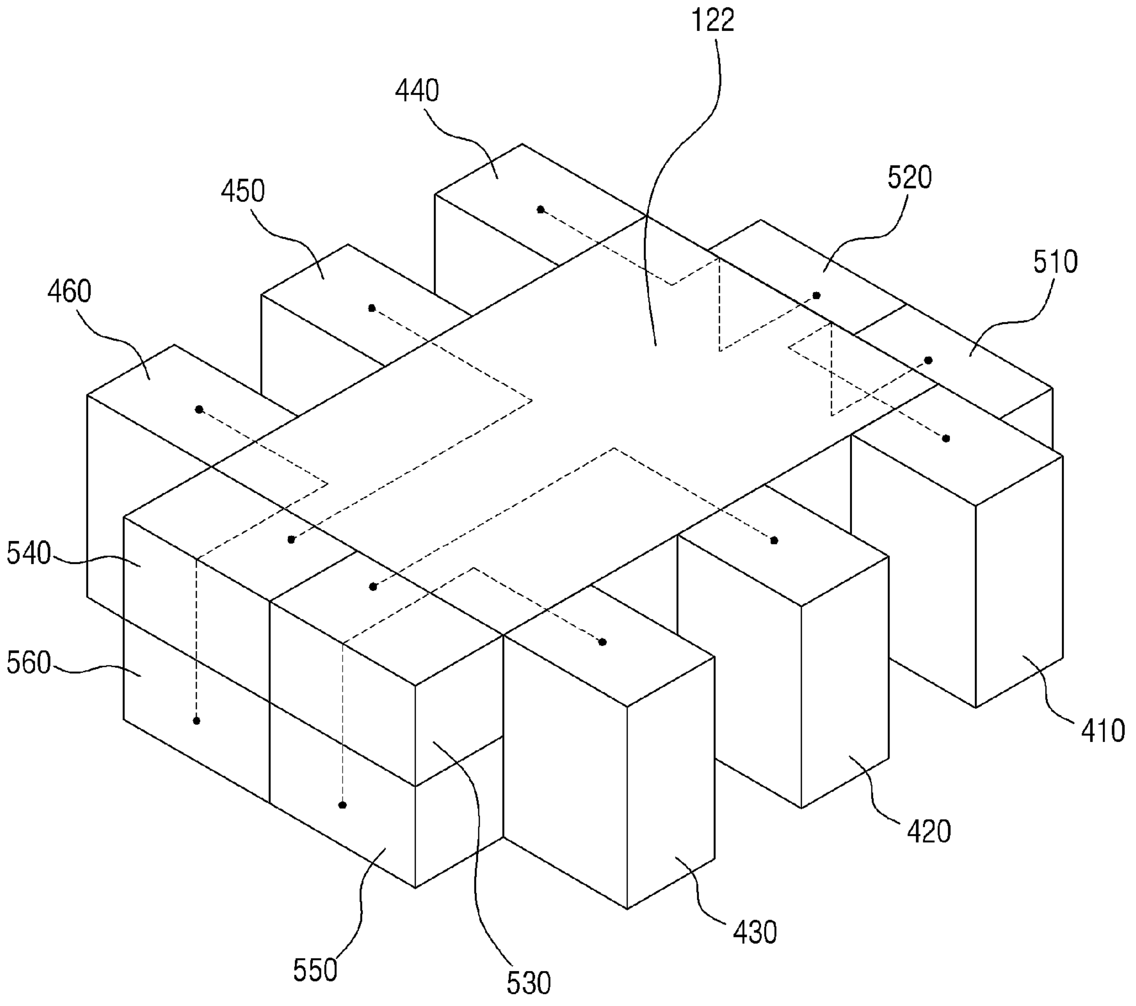

[FIG. 7]
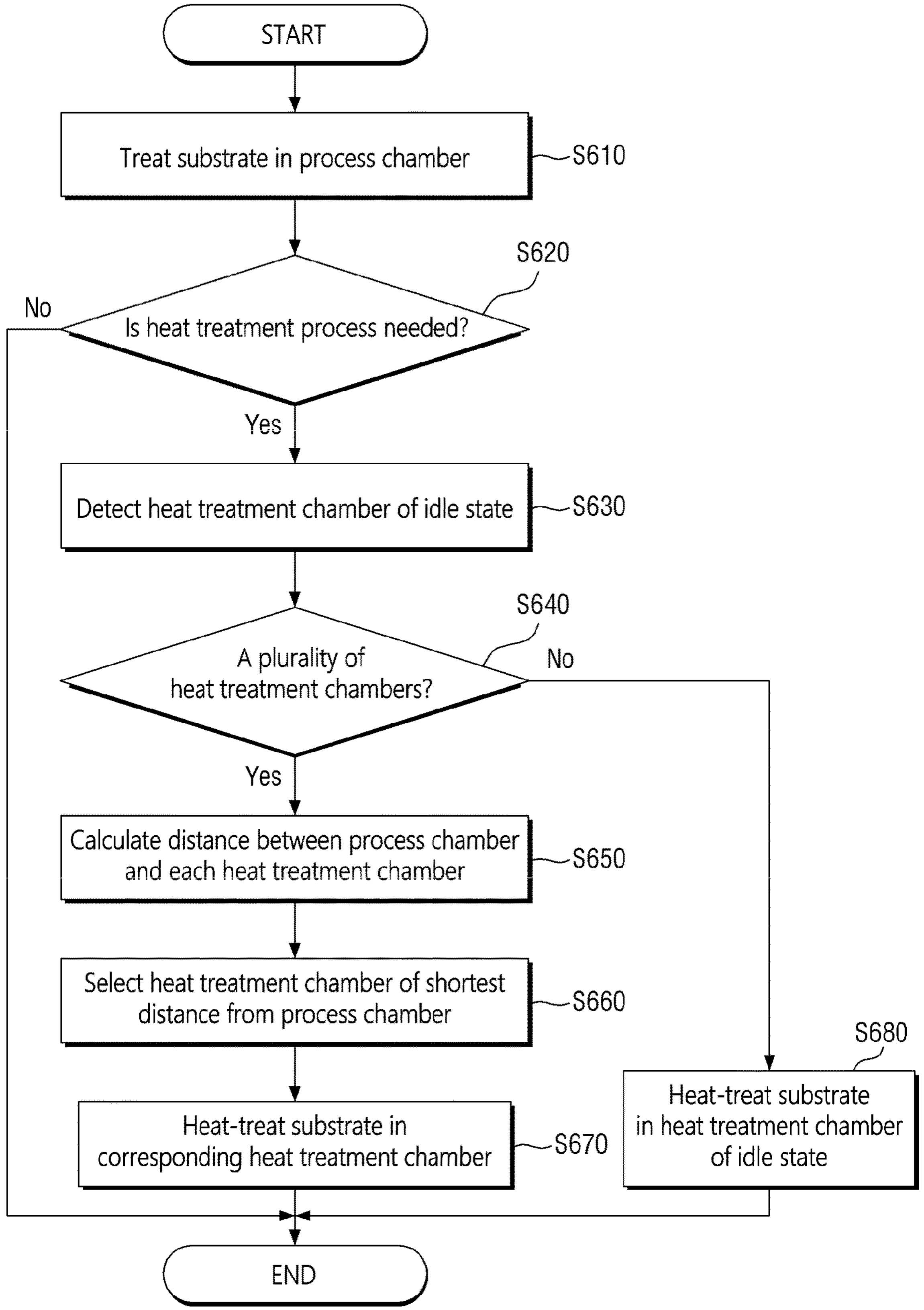

[FIG. 8]
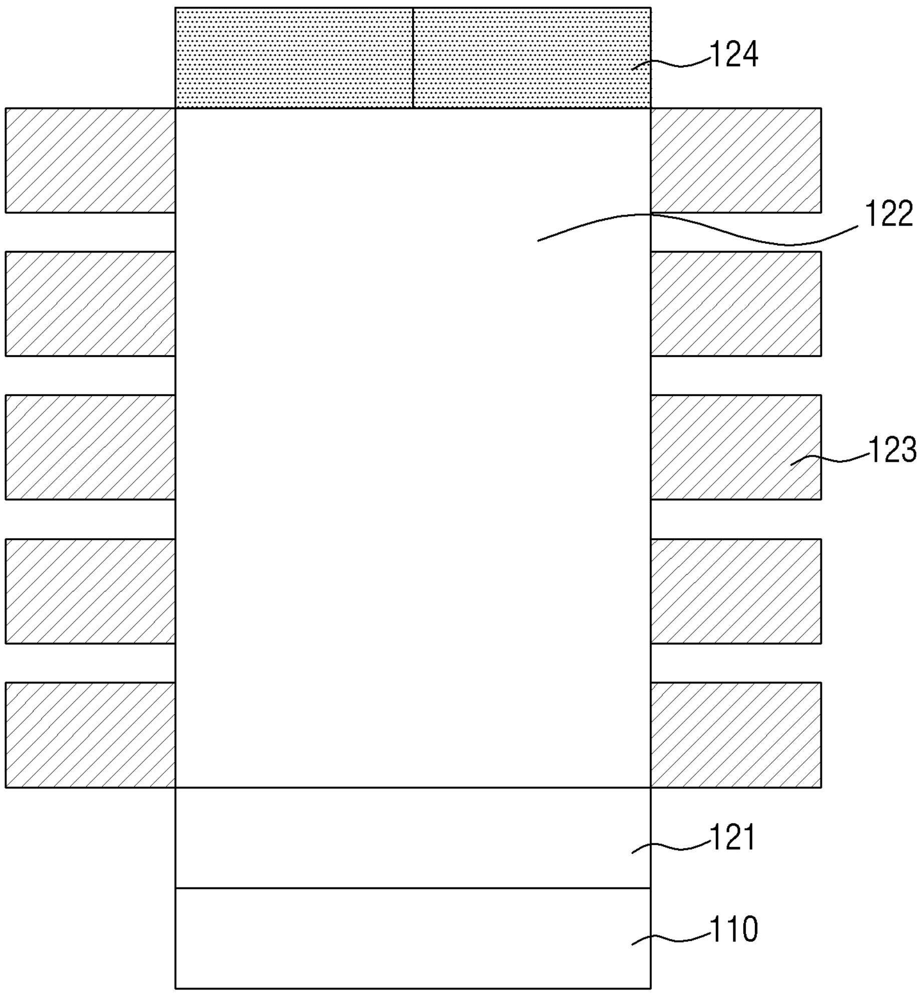

[FIG. 9]
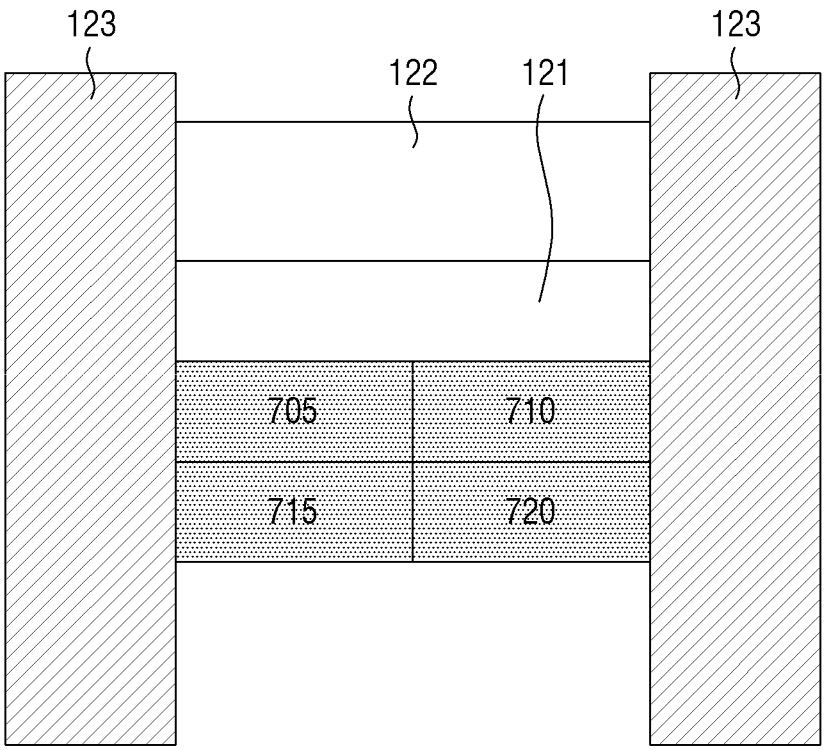

[FIG. 10]
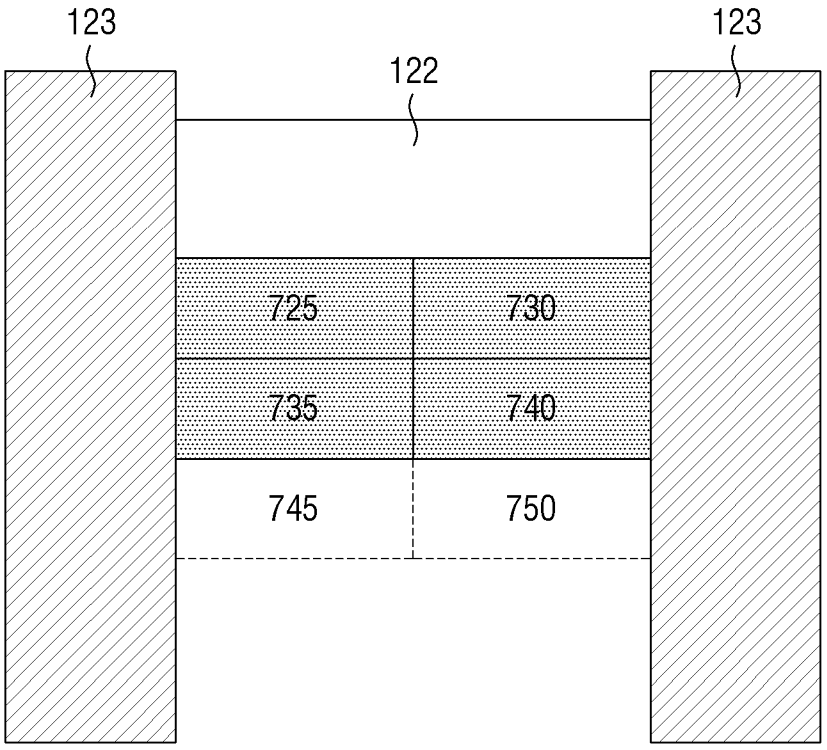

[FIG. 11]
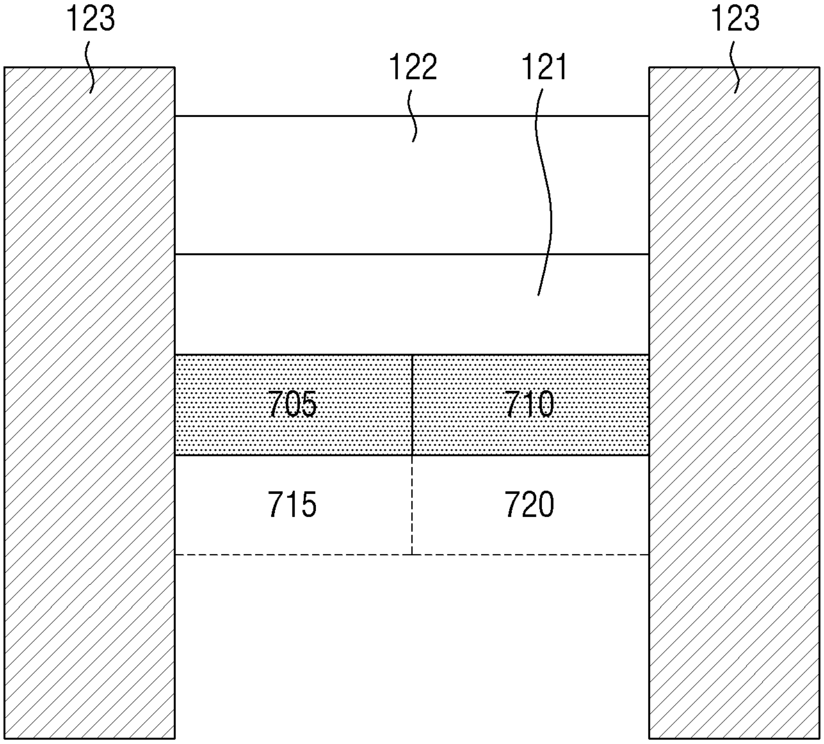

[FIG. 12]
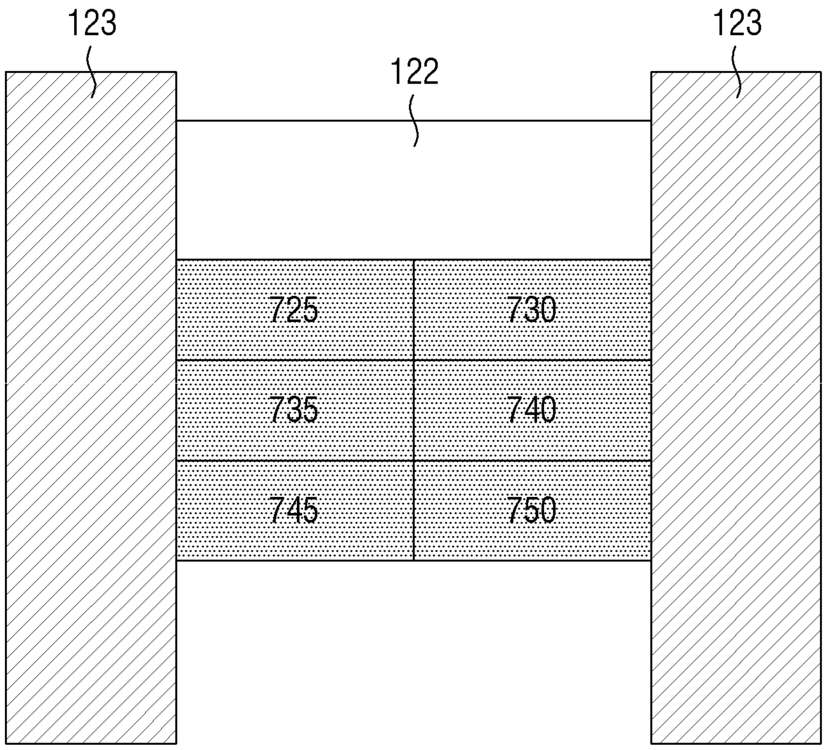
[FIG. 13]
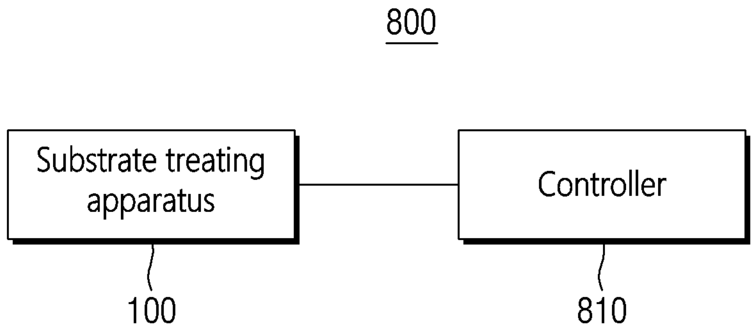

SUBSTRATE TREATING APPARATUS AND SUBSTRATE TREATING SYSTEM COMPRISING THE SAME

CROSS-REFERENCE TO RELATED APPLICATION

This application claims priority from Korean Patent Application No. 10-2020-0120391 filed on Sep. 18, 2020 in the Korean Intellectual Property Office, and all the benefits accruing therefrom under 35 U.S.C. 119, the contents of which in its entirety are herein incorporated by reference.

TECHNICAL FIELD

The present disclosure relates to a substrate treating apparatus and a substrate treating system comprising the same, and more particularly, to a substrate treating apparatus provided with a heat treatment chamber and a substrate treating system comprising the same.

DESCRIPTION OF THE RELATED ART

A process of manufacturing a semiconductor device may consecutively be performed in a semiconductor manufacturing equipment, and may be divided into a pre-process and a post-process. The semiconductor manufacturing equipment may be arranged in a space generally defined as FAB to manufacture the semiconductor device.

The pre-process refers to a process of completing a chip by forming a circuit pattern on a wafer. The pre-process may include a deposition process of forming a thin film on a wafer, a photo-lithography process of transferring a photo resist on the thin film by using a photo mask, an etching process of selectively removing an unnecessary portion by using a chemical material or a reactive gas to form a desired circuit pattern on the wafer, an ashing process of removing the photo resist remaining after etching, an ion implantation process of implanting ions to a portion connected with the circuit pattern to have characteristics of an electronic device, and a cleaning process of removing a pollutant on the wafer.

The post-process refers to a process of evaluating performance of a product completed through the pre-process. The post-process may include a wafer test process of testing whether each chip on the wafer operates, to sort a normal product or a defect, a packaging process of cutting and separating each chip through dicing, die bonding, wire bonding, molding, marking, etc. to have a shape of the product, and a final test process of finally testing characteristics and reliability of the product through an electrical characteristic test, a burn-in test, etc.

The semiconductor manufacturing equipment includes a process chamber and an anneal chamber to treat a substrate (for example, wafer). However, since the anneal chamber is less used than the process chamber, the semiconductor manufacturing equipment includes anneal chambers smaller than the number of process chambers. Therefore, even though a process time of an anneal process is very shorter than that of the other processes (for example, etching process, cleaning process, etc.), unit per equipment hour (UPEH) deterioration caused by shortage of the anneal chambers may occur when the anneal process is required.

BRIEF SUMMARY OF THE INVENTION

An object of the present disclosure is to provide a substrate treating apparatus and a substrate treating system comprising the same, in which the number of heat treatment chambers such as anneal chambers may be varied.

The objects of the present disclosure are not limited to those mentioned above, and additional objects of the present disclosure, which are not mentioned herein, will be clearly understood by those skilled in the art from the following description of the present disclosure.

According to an aspect of the present disclosure to achieve the above objects, a substrate treating apparatus comprises a first chamber heat-treating a substrate; and a second chamber treating the substrate in another way different from heat-treatment, wherein the number of the first chambers is varied depending on the number of the second chambers that need heat treatment for the substrate.

The same number of first chambers as the second chambers may be arranged, or the first chambers smaller than the number of the second chambers may be arranged.

The number of the second chambers that need heat treatment for the substrate may be determined depending on whether process by-products are generated.

When the process by-products are generated may be determined depending on at least one of a process temperature or a type of a material to be treated.

The substrate treating apparatus may further comprise a transfer chamber moving the substrate to any one of the first chamber and the second chamber, wherein the first chamber may be arranged at a side of the transfer chamber, at which the second chamber is not arranged.

The substrate treating apparatus may further comprise a buffer unit arranged at a first side of the transfer chamber, temporarily storing the substrate, wherein the first chamber may be arranged on at least one of the first side of the transfer chamber or a second side of the transfer chamber, which faces the first side.

When the first chamber is arranged at the first side, the first chamber may be arranged to be lower than the buffer unit.

When the first chamber is arranged at the first side and the second side, more first chambers may be arranged at the second side than the first side.

When the same number of first chambers as the second chambers are arranged, the first chambers may be process-connected with the second chambers in a one-to-one relationship.

The first chambers may be process-connected with the second chambers in a one-to-one relationship in consideration of a distance with the second chambers.

The second chamber may be arranged in a plural number, and the first chamber may temporarily be process-connected with any one of the plurality of second chambers depending on whether the first chamber is in an idle state.

The second chamber may be process-connected with any one first chamber selected in consideration of a distance with each first chamber when a plurality of first chambers of an idle state are provided.

The first chamber may heat-treat the substrate by using an anneal process.

The first chamber may be arranged to be fixed to and detached from the substrate treating apparatus.

The second chamber may include a chuck made of a metal material when it does not need heat treatment for the substrate.

The second chamber may treat the substrate by etching or cleaning.

According to another aspect of the present disclosure to achieve the above objects, a substrate treating apparatus comprises a first chamber heat-treating a substrate by using an anneal process; and a second chamber treating the substrate in another way different from heat-treatment, wherein the number of the first chambers is varied depending on the number of the second chambers that need heat treatment for the substrate, the number of the second chambers that need heat treatment for the substrate is determined depending on whether process by-products are generated, and whether the process by-products are generated is determined depending on at least one of a process temperature or a type of a material to be treated.

According to other aspect of the present disclosure to achieve the above objects, a substrate treating system comprises a substrate treating apparatus including a first chamber heat-treating a substrate, and a second chamber treating the substrate in another way different from heat-treatment; and a controller controlling a process connection method between the first chamber and the second chamber, wherein the number of the first chambers is varied depending on the number of the second chambers that need heat treatment for the substrate.

Details of the other embodiments are included in the detailed description and drawings.

BRIEF DESCRIPTION OF THE DRAWINGS

The above and other aspects and features of the present disclosure will become more apparent by describing in detail exemplary embodiments thereof with reference to the attached drawings, in which:

FIG. 1 is a schematic plane view illustrating an inner structure of a substrate treating apparatus according to one embodiment of the present disclosure;

FIG. 2 is a plane view illustrating an arrangement structure between a process chamber and a heat treatment chamber according to one embodiment;

FIG. 3 is a front view illustrating an arrangement structure between a process chamber and a heat treatment chamber according to one embodiment;

FIG. 4 is a rear view illustrating an arrangement structure between a process chamber and a heat treatment chamber according to one embodiment;

FIG. 5 is an exemplary view illustrating an arrangement position of a process chamber;

FIG. 6 is a first exemplary view illustrating various process connection methods between a process chamber and a heat treatment chamber according to one embodiment;

FIG. 7 is a second exemplary view illustrating various process connection methods between a process chamber and a heat treatment chamber according to one embodiment;

FIG. 8 is a plane view illustrating an arrangement structure between a process chamber and a heat treatment chamber according to another embodiment;

FIG. 9 is a front view illustrating an arrangement structure between a process chamber and a heat treatment chamber according to another embodiment;

FIG. 10 is a rear view illustrating an arrangement structure between a process chamber and a heat treatment chamber according to another embodiment;

FIG. 11 is a front view illustrating an arrangement structure between a process chamber and a heat treatment chamber according to other embodiment;

FIG. 12 is a rear view illustrating an arrangement structure between a process chamber and a heat treatment chamber according to other embodiment; and FIG. 13 is a schematic view illustrating a substrate treating system comprising a substrate treating apparatus according to various embodiments of the present disclosure.

DETAILED DESCRIPTION OF THE DISCLOSURE

Hereinafter, preferred embodiments of the present disclosure will be described with reference to the accompanying drawings. The advantages and features of the present disclosure and methods of achieving the advantages will be apparent from the following embodiments that will be described in more detail with reference to the accompanying drawings. It should be noted, however, that the present disclosure is not limited to the following embodiments, and may be implemented in various forms. Rather, these embodiments are provided so that the present disclosure will be thorough and complete, and will fully convey the scope of the invention to those skilled in the art. The present disclosure is defined only by the scope of the claims. The same reference numerals refer to the same elements throughout the specification.

It will be understood that when an element or layer is referred to as being "on" another element or layer, it includes all cases that not only the element or layer is directly on another element but also other element or layer is interposed between the element or layer and another element or layer. In contrast, when an element is referred to as being "directly on" another element, it indicates that other element or layer is not interposed between the element or layer and another element or layer.

Spatially relative terms, such as "below," "beneath," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented and the spatially relative terms used herein interpreted accordingly.

It will be understood that, although the terms "first", "second", etc. may be used herein to describe various elements, components, and/or sections, these elements, components, and/or sections should not be limited by these terms. These terms are only used to distinguish one element, component, or section from another element, component, or section. Thus, a first element, component, or section discussed below could be termed a second element, component, or section without departing from the technical spirits of the present disclosure.

The terminology used herein is for the purpose of describing embodiments only and is not intended to limit the invention. As used herein, the singular terms are intended to include the plural forms as well, unless the context clearly indicates otherwise. As used herein, the terms "comprises" and/or "comprising" specify the presence of stated features, steps, operations, and/or elements, but do not preclude the presence or addition of one or more other features, steps, operations and/or elements thereof.

Unless otherwise defined, all terms (including technical and scientific terms) used herein have the same meaning as commonly understood by the person with ordinary skill in the art to which the present disclosure pertains. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Hereinafter, the embodiments of the present disclosure will be described in detail with reference to the accompanying drawings. In describing the present disclosure with reference to the accompanying drawings, the same reference numerals will be given to the same or corresponding elements and their repeated description will be omitted.

The present disclosure relates to a substrate treating apparatus and method that may vary the number of heat treatment chambers. Hereinafter, the present disclosure will be described in detail with reference to the drawings.

FIG. 1 is a schematic plane view illustrating an inner structure of a substrate treating apparatus according to one embodiment of the present disclosure.

Referring to FIG. 1, a substrate treating apparatus 100 may include an index module 110 and a process treatment module 120.

The index module 110 and the process treatment module 120 may sequentially be arranged in one direction. In this embodiment, a direction in which the index module 110 and the process treatment module 120 are arranged will be defined as a first direction 10. Also, when viewed from an upper side, a direction perpendicular to the first direction 10 will be defined as a second direction 20, and a direction perpendicular to a plane that includes the first direction 10 and the second direction 20 will be defined as a third direction 30.

The index module 110 is disposed at the front of the process treatment module 120. The index module 110 may include a load port 111 and a transfer frame 112. The index module 110 may be implemented as an Equipment Front End Module (EFEM), for example.

A container 130 in which a substrate (for example, wafer) is accommodated is seated on the load port 111. The load port 111 may be provided at the front of the transfer frame 112 in a plural number. The plurality of load ports 111 may be arranged in a line along the second direction 20.

In FIG. 1, four load ports 111 are provided to the index module 110. However, this embodiment is not limited to the example of FIG. 1. The number of load ports 111 may be increased or reduced depending on process efficiency and foot-print conditions of the process treatment module 120.

A plurality of substrates are accommodated in the container 130. The container 130 may include a slot (not shown) therein, which is provided to support edges of the substrate.

The slot may be provided in a plural number in the third direction 30. In this case, the substrates may be positioned in the container 130 in a state that the substrates are deposited to be spaced apart from one another. The container 130 may be implemented as a front opening unified pod (FOUP), for example.

The transfer frame 112 carries the substrates between the container 130 seated on the load port 111 and a buffer unit 121. The transfer frame 112 may include an index rail 210 and an index robot 220.

The index rail 210 provides a path through which the index robot 220 moves. The index rail 210 may be disposed such that its length direction is to be parallel with the second direction 20.

The index robot 220 directly carries the substrates. The index robot 220 may be arranged on the index rail 210 and linearly move on the index rail 210 along the second direction 20.

The index robot 220 may include a first base 221, a first body 222, and an index arm 223. In this case, the first base 221 may be arranged to be movable along the index rail 210.

The first body 222 may be coupled to the first base 221. The first body 222 may be provided to be movable on the first base 221 along the third direction 30. Also, the first body 222 may be provided to rotate on the first base 221.

The index arm 223 may be coupled to the first body 222, and may be provided to move in forward and backward directions with respect to the first body 222. The index arm 223 may be provided on the first body 222 in a plural number, whereby the plurality of index arms 223 may be driven individually.

The plurality of index arms 223 may be disposed to be deposited in a state that they are spaced apart from one another along the third direction 30. Some of the index arms 223 may be used when carrying the substrates from the process treatment module 120 to the container 130, and the other index arms 223 may be used when carrying the substrates from the container 130 to the process treatment module 120. When the plurality of index arms 223 are configured in this way, it may prevent particles generated from the substrates prior to process treatment from being attached to the substrates after process treatment while the index robot 220 is loading and unloading the substrates.

The process treatment module 120 may include the buffer unit 121, a transfer chamber 122, and a process chamber 123.

The buffer unit 121 provides a space in which the substrates stay before the substrates are carried, between the transfer frame 112 and the transfer chamber 122. To this end, the buffer unit 121 may be disposed between the transfer frame 112 and the transfer chamber 122. The buffer unit 121 may be implemented as a loadlock chamber, for example.

The buffer unit 121 may be provided with a slot in which a substrate is placed therein. The slot may be provided in the buffer unit 121 in a plural number, and the plurality of slots may be spaced apart from one another along the third direction 30. A surface of the buffer unit 121 facing the transfer frame 112 and a surface of the buffer unit 121 facing the transfer chamber 122 may be opened respectively.

The transfer chamber 122 carries the substrates between the buffer unit 121 and the process chamber 123. The transfer chamber 122 may include a guide rail 230 and a main robot 240. The transfer chamber 122 may carry the substrates between two different process chambers 123.

The guide rail 230 provides a path through which the main robot 240 moves. The guide rail 230 may be disposed such that its length direction is to be parallel with the first direction 10.

The main robot 240 directly carries the substrates. The main robot 240 may be arranged on the guide rail 230 and linearly move on the guide rail 230 along the first direction 10.

The main robot 240 may include a second base 241, a second body 242, and a main arm 243. In this case, the second base 241 may be arranged to be movable along the guide rail 230.

The second body 242 may be coupled to the second base 241. The second body 242 may be provided to be movable on the second base 241 along the third direction 30. Also, the second body 242 may be provided to rotate on the second base 241.

The main arm 243 may be coupled to the second body 242, and may be provided to move in forward and backward directions with respect to the second body 242. The main arm 243 may be provided on the second body 242 in a plural number, whereby the plurality of main arms 243 may be driven individually.

The plurality of main arms 243 may be disposed to be deposited in a state that they are spaced apart from one another along the third direction 30. Some of the main arms 243 may be used when carrying the substrates from the buffer unit 121 to the process chamber 123, and the other main arms 243 may be used when carrying the substrates from the process chamber 123 to the buffer unit 121.

The transfer chamber 122 may be disposed such that its length direction is to be parallel with the first direction 10. At this time, a plurality of process chambers 123 may respectively be disposed at both sides of the transfer chamber 122 along the second direction 20, and the plurality of process chambers 123 may be disposed at each side of the transfer chamber 122 along the first direction 10.

The plurality of process chambers 123 may be disposed to be deposited with respect to one another. That is, the plurality of process chambers 123 may be disposed at one side of the transfer chamber 122 in an arrangement of X*Y. In this case, X is a natural number of 1 or more, and means the number of process chambers 123 provided in a line along the first direction 10. Y is a natural number of 1 or more, and means the number of process chambers 123 provided in a line along the third direction 30.

For example, when four process chambers 123 are provided at one side of the transfer chamber 122, the four process chambers 123 may be disposed in an arrangement of 2*2. When six process chambers 123 are provided at one side of the transfer chamber 122, the six process chambers 123 may be disposed in an arrangement of 3*2.

Meanwhile, the number of process chambers 123 may be increased or reduced. Also, the process chambers may be provided only at one side of the transfer chamber 122, or may be provided at one side or both sides of the transfer chamber 122 as a single layer.

The substrate treating apparatus 100 may also include a heat treatment chamber 124 together with the process chamber 123.

FIG. 2 is a plane view illustrating an arrangement structure between a process chamber and a heat treatment chamber according to one embodiment, FIG. 3 is a front view illustrating an arrangement structure between a process chamber and a heat treatment chamber according to one embodiment, and FIG. 4 is a rear view illustrating an arrangement structure between a process chamber and a heat treatment chamber according to one embodiment. The following description will be given with reference to FIGS. 2 to 4.

The process chamber 123 is a second chamber 123 that performs a first process of treating the substrates. The process chamber 123 may perform another process except a heat treatment process as the first process. The process chamber 123 may perform, for example, an etching process, a cleaning process, etc. as the first process.

The process chamber 123 may be arranged at both sides of the transfer chamber 122. As shown in FIG. 5, when a side of the transfer chamber 122, which adjoins the index module 110, is defined as a first side 310 and another side of the transfer chamber 122, which adjoins the first side, is defined as a second side 320, another two sides of the transfer chamber 122 may be defined as a third side 330 and a fourth side 340. In this case, the process chamber 123 may respectively be arranged at the third side 330 and the fourth side 340 of the transfer chamber 122. FIG. 5 is an exemplary view illustrating an arrangement position of the process chamber.

The process chamber 123 may be arranged at both sides of the transfer chamber 122 in a plural number. For example, three process chambers 123 may be arranged at each side of the transfer chamber 122, whereby a total of six process chambers 123 may be arranged at both sides of the transfer chamber 122. Hereinafter, the description will be given based on that six process chambers 123 are arranged at both sides of the transfer chamber 122 as an example, but the number of process chambers 123 in this embodiment is not limited to six.

When the plurality of process chambers 123 are arranged at both sides of the transfer chamber 122, the plurality of process chambers 123 may perform the same process. For example, all of the plurality of process chambers 123 may perform an etching process. However, this embodiment is not limited to this example. The plurality of process chambers 123 may perform their respective processes different from one another.

Some of the plurality of process chambers 123 may perform the same process, and the other some of the plurality of process chambers 123 may perform different processes. For example, at least one process chamber 123 arranged at one side of the transfer chamber 122 may perform an etching process while at least one process chamber 123 arranged at the other side of the transfer chamber 122 may perform a cleaning process.

The heat treatment chamber 124 is a first chamber that performs a second process of heat-treating the substrates. The heat treatment chamber 124 may perform, for example, an anneal process as the second process.

The heat treatment chamber 124 may be arranged at one side or both sides of the transfer chamber 122. When each side of the transfer chamber 122 is defined as shown in FIG. 5, the heat treatment chamber 124 may be arranged at the side of at least one of the first side 310 or the second side 320 of the transfer chamber 122.

The heat treatment chamber 124 may be arranged at one side or both sides of the transfer chamber 122 in a plural number. In this case, the number of the heat treatment chambers 124 may be equal to the number of the process chambers 123.

As described above, six process chambers 123 may be arranged at the third side 330 and the fourth side 340 of the transfer chamber 122. In this case, six heat treatment chambers 124 may be arranged at the first side 310 and the second side 320 of the transfer chamber 122.

When six heat treatment chambers are arranged at the first side 310 and the second side 320 of the transfer chamber 122, two heat treatment chambers may be arranged at the first side 310 of the transfer chamber 122, and four heat treatment chambers may be arranged at the second side 320 of the transfer chamber 122.

When the plurality of heat treatment chambers 124, particularly the same number of heat treatment chambers 124 as the number of process chambers 123 are arranged at the first side 310 and the second side 320 of the transfer chamber 122, the heat treatment chambers may be more arranged at the second side 320 of the transfer chamber 122 than the first side 310 of the transfer chamber 122 as described above.

However, this embodiment is not limited to the above example. The same number of heat treatment chambers 124 may be arranged at each of the first side 310 and the second side 320 of the transfer chamber 122, or the heat treatment chambers 124 may be more arranged at the first side 310 of the transfer chamber 122 than the second side 320 of the transfer chamber 122.

When L number of heat treatment chambers 124 are provided in the substrate treating apparatus 100, the heat treatment chambers 124 may be more arranged at the first side 310 of the transfer chamber 122 than the second side 320 of the transfer chamber 122. For example, when two heat treatment chambers 124 are provided in the substrate treating apparatus 100, the two heat treatment chambers 124 may be arranged at the first side 310 of the transfer chamber 122.

When M number (in this case, M>L) of heat treatment chambers 124 are provided in the substrate treating apparatus 100, the same number of heat treatment chambers 124 may be arranged at each of the first side 310 and second side 320 of the transfer chamber 122. For example, when four heat treatment chambers 124 are provided in the substrate treating apparatus 100, two heat treatment chambers 124 may be arranged at the first side 310 of the transfer chamber 122, and the other two heat treatment chambers 124 may be arranged at the second side 320 of the transfer chamber 122.

When N number (in this case, N>M) of heat treatment chambers 124 are provided in the substrate treating apparatus 100, the heat treatment chambers 124 may be more arranged at the second side 310 of the transfer chamber 122 than the first side 310 of the transfer chamber 122. For example, when six heat treatment chambers 124 are provided in the substrate treating apparatus 100, two heat treatment chambers 124 may be arranged at the first side 310 of the transfer chamber 122, and the other four heat treatment chambers 124 may be arranged at the second side 320 of the transfer chamber 122.

Although the above description is based on each case that L, M and N number of heat treatment chambers 124 are respectively provided in the substrate treating apparatus 100, this embodiment is not limited to the above examples.

When the process chambers 123 and the heat treatment chambers 124 are arranged in the substrate treating apparatus 100 as the same number, the process chambers 123 may be process-connected with the heat treatment chambers 124 in a one-to-one relationship. In this case, the process connection means that the substrate treated in the corresponding process chamber 123 is heat-treated in the corresponding heat treatment chamber 124.

Hereinafter, the description will be given based on that six process chambers 123 and six heat treatment chambers 124 are arranged in the substrate treating apparatus 100, as an example. FIG. 6 is a first exemplary view illustrating various process connection methods between a process chamber and a heat treatment chamber according to one embodiment. The following description will be given with reference to FIG. 6.

A first process chamber 410, a second process chamber 420 and a third process chamber 430 may be arranged at the third side 330 of the transfer chamber 122, and a fourth process chamber 440, a fifth process chamber 450 and a sixth process chamber 460 may be arranged at the fourth side 340 of the transfer chamber 122.

Also, a first heat treatment chamber 510 and a second heat treatment chamber 520 may be arranged at the first side 310 of the transfer chamber 122, a third heat treatment chamber 530, a fourth heat treatment chamber 540, a fifth heat treatment chamber 550 and a sixth heat treatment chamber 560 may be arranged at the second side 320 of the transfer chamber 122. The third heat treatment chamber 530 and the fourth heat treatment chamber 540 may be arranged to be higher than the fifth heat treatment chamber 550 and the sixth heat treatment chamber 560.

When the first to sixth process chambers 410 to 460 and the first to sixth heat treatment chambers 510 to 560 are arranged as above, the heat treatment chambers 124 may be process-connected with the process chambers 123 in a one-to-one relationship by considering a moving distance to the process chambers 123.

For example, the first heat treatment chamber 510 may be process-connected with the first process chamber 410, the second heat treatment chamber 520 may be process-connected with the fourth process chamber 440, the third heat treatment chamber 530 may be process-connected with the second process chamber 420, the fourth heat treatment chamber 540 may be process-connected with the fifth process chamber 450, the fifth heat treatment chamber 550 may be process-connected with the third process chamber 430, and the sixth heat treatment chamber 560 may be process-connected with the sixth process chamber 460.

However, this embodiment is not limited to the above example. The first to sixth heat treatment chambers 510 to 560 may randomly be process-connected with the first to sixth process chambers 410 to 460 in a one-to-one relationship.

Meanwhile, the first to sixth heat treatment chambers 510 to 560 may not be process-connected with the first to sixth process chambers 410 to 460 in a one-to-one relationship. That is, the first to sixth heat treatment chambers 510 to 560 may temporarily be process-connected with any one of the first to sixth process chambers 410 to 460 in accordance with a status without being continuously process-connected with the same in accordance with a predefined reference. This case will be described as follows.

FIG. 7 is a second exemplary view illustrating various process connection methods between a process chamber and a heat treatment chamber according to one embodiment. The following description will be given with reference to FIG. 7.

When a substrate is treated in any one of the first to sixth process chambers 410 to 460 (S610), it is determined whether a heat treatment process is required for the substrate (S620).

When it is determined that the heat treatment process is required for the substrate, a heat treatment chamber of an idle state is detected from the first to sixth heat treatment chambers 510 to 560 (S630).

When the heat treatment chamber of the idle state is detected, it is determined whether the number of the heat treatment chamber of the idle state is one (S640).

When it is determined that the number of the heat treatment chamber of the idle state is not one (that is, when it is determined that the number of heat treatment chambers of the idle state are a plural number), a distance between the process chamber that has treated the substrate and each heat treatment chamber of the idle state is calculated (S650).

Afterwards, the heat treatment chamber positioned at a distance closest to the process chamber, which has treated the substrate, among the plurality of heat treatment chambers of the idle state, is selected (S660). For example, when the process chamber that has treated the substrate is the first process chamber 410 and the heat treatment chambers of the idle state are the second heat treatment chamber 520, the fourth heat treatment chamber 540 and the fifth heat treatment chamber 550, the second heat treatment chamber 520 positioned at a distance closest to the first process chamber 410 may be selected.

Afterwards, the substrate moves to the corresponding heat treatment chamber by using the transfer chamber 122, whereby the substrate is heat-treated in the corresponding heat treatment chamber (S670).

Meanwhile, when it is determined that the number of the heat treatment chamber of the idle state is one, the substrate moves to the heat treatment chamber of the idle state by using transfer chamber 122, whereby the substrate is heat-treated in the corresponding heat treatment chamber (S680).

In this embodiment, when the heat treatment chamber of the idle state is detected and the number of the heat treatment chambers of the idle state is a plural number, any one heat treatment chamber may randomly be selected, whereby the substrate may be heat-treated in the corresponding heat treatment chamber.

Meanwhile, in this embodiment, the number of heat treatment chambers 124 is not limited to be equal to the number of process chambers 123 in the substrate treating apparatus 100. That is, the heat treatment chambers 124 smaller than the number of the process chambers 123 may be arranged in the substrate treating apparatus 100.

However, as described above, when the heat treatment chambers 124 smaller than the number of the process chambers 123 are arranged in the substrate treating apparatus 100, the substrate treated by the process chamber 123 may be on standby without being immediately heat-treated due to non-presence of the heat treatment chamber 124 of the idle state, whereby unit per equipment hour (UPEH) deterioration may occur.

Therefore, this embodiment is characterized in that the number of the heat treatment chambers 124 arranged in the substrate treating apparatus 100 may be varied depending on the number of the process chambers 123, which need the heat treatment process for the substrate, among the plurality of process chambers 123. Hereinafter, this will be described.

The number of process chambers 123 that need the heat treatment process may be determined depending on whether the heat treatment process (for example, anneal process) is required. When the substrate is treated in the process chamber 123, process by-products which by-products in regard to a process (for example, particles) may be generated or not.

In the case that the process by-products are generated when the substrate is treated in the process chamber 123, the heat treatment process is required for the corresponding substrate. On the other hand, in the case that the process by-products are not generated when the substrate is treated in the process chamber 123, the heat treatment process is not required for the corresponding substrate. Whether the process by-products are generated may be determined depending on a process condition (for example, process temperature) or a type of a target material (for example, etch amount such as oxide film ($SiO_2$) and nitride film (SiN)).

When ten process chambers 123 are arranged in the substrate treating apparatus 100, the heat treatment chamber(s) 124 of minimum 0 to maximum ten may be arranged depending on the number of process chambers 123 that need the heat treatment process for the substrate. For example, eight heat treatment chambers 124 may be arranged as shown in FIGS. 8 to 11.

Since the number of the heat treatment chambers 124 that are arranged may be varied in the substrate treating apparatus 100 as described above, it is preferable that the heat treatment chambers 124 are arranged to be fixed to or detached from the substrate treating apparatus 100. Spaces in which the heat treatment chambers 124 may be arranged are previously provided to correspond to the number of process chambers 123, and the number of heat treatment chambers 124 may be adjusted depending on the number of process chambers 123 that need the heat treatment process for the substrate.

FIG. 8 is a plane view illustrating an arrangement structure between a process chamber and a heat treatment chamber according to another embodiment, FIG. 9 is a front view illustrating an arrangement structure between a process chamber and a heat treatment chamber according to another embodiment, and FIG. 10 is a rear view illustrating an arrangement structure between a process chamber and a heat treatment chamber according to another embodiment.

When ten process chambers 123 are arranged in the substrate treating apparatus 100 as shown in FIG. 8, maximum ten heat treatment chambers 124 may be arranged, whereby ten spaces 705 to 750 in which the heat treatment chambers 124 may be arranged may be provided.

When ten spaces 705 to 750 in which the heat treatment chambers 124 may be arranged are provided, as shown in FIGS. 9 and 10, four spaces may be provided at the first side 310 of the transfer chamber 122 and six spaces may be provided at the second side 320 of the transfer chamber 122.

However, this embodiment is not limited to the above example. In this embodiment, it is sufficient that at least one space 705 to 750 in which the heat treatment chambers 124 may be arranged is provided at the first side 310 of the transfer chamber 122 and the other spaces are provided at the second side 320 of the transfer chamber 122. Meanwhile, in this embodiment, all of the spaces 705 to 750 in which the heat treatment chambers 124 may be arranged may be provided at any one of the first side 310 and the second side 320 of the transfer chamber 122.

Hereinafter, the description will be given based on that four spaces 705 to 750 in which the heat treatment chambers 124 may be arranged are provided at the first side 310 of the transfer chamber 122 and six spaces 725 to 750 are provided at the second side 320 of the transfer chamber 122, and eight heat treatment chambers 124 are arranged depending on the number of process chambers 123 that need the heat treatment process for the substrate.

Four heat treatment chambers 124 may be arranged at each of the first side 310 and the second side 320 of the transfer chamber 122 as shown in FIGS. 9 and 10. For example, first to fourth heat treatment chambers may be arranged in four spaces 705, 710, 715 and 720 provided at the first side 310 of the transfer chamber 122, and fifth to eighth heat treatment chambers may be arranged in four spaces 725, 730, 735 and 740 of six spaces 725, 730, 735, 740, 745 and 750 provided at the first side 310 of the transfer chamber 122.

However, this embodiment is not limited to the above example. In this embodiment, eight heat treatment chambers 124 may freely and selectively be arranged in ten spaces 705 to 750 that are previously provided.

For example, as shown in FIGS. 11 and 12, two heat treatment chambers 124 may be arranged at the first side 310 of the transfer chamber 122, and six heat treatment chambers 124 may be arranged at the second side 320 of the transfer chamber 122. In this case, first and second heat treatment chambers may be arranged in two spaces 705 and 710 of four spaces 705, 710, 715 and 720 provided at the first side 310 of the transfer chamber 122, and third to eighth heat treatment chambers may be arranged in six spaces 725, 730, 735, 740, 745 and 750 provided at the second side 310 of the transfer chamber 122. FIG. 11 is a front view illustrating an arrangement structure between a process chamber and a heat treatment chamber according to other embodiment, and FIG. 12 is a rear view illustrating an arrangement structure between a process chamber and a heat treatment chamber according to other embodiment.

The heat treatment chamber 124 may be arranged to be fixed to or detached from the substrate treating apparatus 100 as described above. For example, the heat treatment chamber 124 may be arranged in the substrate treating apparatus 100 in the form of a desk drawer. Alternatively, the heat treatment chamber 124 may be arranged on an accommodating space in a device provided in the form of a support beam.

Meanwhile, when the same number of heat treatment chambers 124 as the process chambers 123 are arranged in the substrate treating apparatus 100 depending on the number of process chambers 123 that need the heat treatment process for the substrate, or the heat treatment chambers 124 smaller than the number of process chambers 123 are provided, the various process connection methods between the process chamber 123 and the heat treatment chamber 124, which are described with reference to FIGS. 6 and 7, may equally be applied to this case.

Meanwhile, when the process chamber 123, which needs the heat treatment process, among the plurality of process chambers 123 arranged in the substrate treating apparatus 100 is determined, a material of a chuck arranged in the process chamber 123 may be determined.

An electro-static chuck (ESC) has a problem in that it is difficult to vary a temperature in the middle of treating the substrate. Therefore, in this embodiment, in case of the process chamber 123 that needs the heat treatment process for the substrate, a chuck made of a ceramic material may be arranged in the corresponding process chamber 123, whereas in case of the process chamber 123 that does not need the heat treatment process for the substrate, a chuck made of a metal material may be arranged in the corresponding process chamber 123.

The metal chuck has an advantage of a fast temperature change from a high temperature to a lower temperature or from a low temperature to a high temperature. Therefore, when the chuck made of a metal material is used as the process chamber 123 that does not need the heat treatment process for the substrate, the process time and process efficiency may be more improved.

The chuck of a metal material may be made of stainless steel (SUS), for example.

Meanwhile, the heat treatment chambers 124 more than the number of process chambers 123 may be arranged in the substrate treating apparatus 100.

Next, a substrate treating system comprising the substrate treating apparatus according to various embodiments of the present disclosure will be described.

FIG. 13 is a schematic view illustrating a substrate treating system comprising a substrate treating apparatus according to various embodiments of the present disclosure.

Referring to FIG. 13, the substrate treating system 800 may include a substrate treating apparatus 100 and a controller 810.

Since the substrate treating apparatus 100 has been described with reference to FIGS. 1 to 12, its detailed description will be omitted.

A controller 810 serves to control the substrate treating apparatus 100. To this end, the controller 810 may be implemented as an apparatus that is provided with a process having a computation function and a control function, a memory having a storage function, and a communication module having a communication function. The controller 810 may be implemented as a computer or a server, for example.

The controller 810 may control various process connection methods between the process chamber 123 and the heat treatment chamber 124 in this embodiment. For example, the controller 810 may control the method described with reference to FIG. 7.

The controller 810 may also control a method for determining the number of process chambers 123 that need the heat treatment process for the substrate, and a method for determining an arrangement structure of the heat treatment chambers 124 arranged depending on the number of the process chambers 123 that need the heat treatment process for the substrate.

Although the embodiments of the present disclosure have been described with reference to the accompanying drawings, it will be apparent to those skilled in the art that the present disclosure may be embodied in other specific forms without departing from the spirit and essential characteristics of the specification. The above embodiments are therefore to be construed in all aspects as illustrative and not restrictive.

What is claimed is:

1. A method for configuring a substrate treating apparatus, the apparatus comprising:

a first chamber heat-treating a substrate; and a second chamber treating the substrate in another way different from heat-treatment, the method comprising:

varying a number of the first chambers depending on a number of the second chambers that need heat treatment for the substrate, and determining the number of the second chambers that need heat treatment for the substrate depending on whether process by-products are generated when the substrate is treated in the second chambers, such that heat treatment is needed for the second chambers in which process by-products are generated, and heat treatment is not needed for the second chambers in which process by-products are not generated.

2. The method of claim 1, wherein the number of the first chambers is the same as the number of the second chambers, or the number of the first chambers is less than the number of the second chambers.

3. The method of claim 1, wherein whether the process by-products are generated is determined depending on at least one of a process temperature or a type of a material to be treated.

4. The method of claim 1, further comprising a transfer chamber moving the substrate to any one of the first chamber and the second chamber, wherein the first chamber is arranged at a side of the transfer chamber at which the second chamber is not arranged.

5. The method of claim 4, further comprising a buffer unit arranged at a first side of the transfer chamber for temporarily storing the substrate, wherein the first chamber is arranged on at least one of the first side of the transfer chamber or a second side of the transfer chamber which faces the first side.

6. The method of claim 5, wherein, when the first chamber is arranged at the first side, the first chamber is arranged to be lower than the buffer unit.

7. The method of claim 5, wherein, when the first chamber is arranged at the first side and the second side, more first chambers are arranged at the second side than the first side.

8. The method of claim 1, wherein, when the same number of first chambers as the second chambers are arranged, the first chambers are process-connected with the second chambers in a one-to-one relationship.

9. The method of claim 8, wherein the first chambers are process-connected with the second chambers in a one-to-one relationship in consideration of a distance with the second chambers.

10. The method of claim 1, wherein a plurality of second chambers are arranged, and the first chamber is temporarily process-connected with any one of the plurality of second chambers depending on whether the first chamber is in an idle state.

11. The method of claim 1, wherein the second chamber is process-connected with any one first chamber selected in consideration of a distance with each first chamber when a plurality of first chambers of an idle state are provided.

12. The method of claim 1, wherein the first chamber heat-treats the substrate by using an anneal process.

13. The method of claim 1, wherein the first chamber is arranged to be fixed to and detached from the substrate treating apparatus.

14. The method of claim 1, wherein the second chamber includes a chuck made of a metal material when it does not need heat treatment for the substrate.

15. The method of claim 1, wherein the second chamber treats the substrate by etching or cleaning.

16. A method for configuring a substrate treating apparatus, the apparatus comprising:

a first chamber heat-treating a substrate by using an anneal process; and a second chamber treating the substrate in another way different from heat-treatment, the method comprising:

varying a number of the first chambers depending on a number of the second chambers that need heat treatment for the substrate, determining the number of the second chambers that need heat treatment for the substrate depending on whether process by-products are generated when the substrate is treated in the second chambers, such that heat treatment is needed for the second chambers in which process by-products are generated, and heat treatment is not needed for the second chambers in which process by-products are not generated, and determining whether the process by-products are generated depending on at least one of a process temperature or a type of a material to be treated.

17. A method for configuring a substrate treating system, the system comprising:

a substrate treating apparatus including a first chamber heat-treating a substrate, and a second chamber treating the substrate in another way different from heat-treatment; and a controller controlling a process connection method between the first chamber and the second chamber, the method comprising:

varying a number of the first chambers depending on a number of the second chambers that need heat treatment for the substrate, and determining the number of the second chambers that need heat treatment for the substrate depending on whether process by-products are generated when the substrate is treated in the second chambers, such that heat treatment is needed for the second chambers in which process by-products are generated, and heat treatment is not needed for the second chambers in which process by-products are not generated.

18. The method of claim 17, wherein the number of the first chambers is the same as the number of the second chambers, or the number of the first chambers is less than the number of the second chambers.

19. The method of claim 17, wherein the substrate treating apparatus further includes a transfer chamber for moving the substrate to any one of the first chamber and the second chamber, and the first chamber is arranged at a side of the transfer chamber, at which the second chamber is not arranged.

* * * * *